United States Patent [19]

Shimizu et al.

[11] Patent Number: 5,454,360

[45] Date of Patent: Oct. 3, 1995

[54] SUPERCHARGED PRESSURE CONTROL DEVICE FOR SUPERCHARGED ENGINE

[75] Inventors: Ryo Shimizu; Masaki Fujii; Hideki Kobayashi, all of Hiroshima, Japan

[73] Assignee: Mazda Motor Corporation, Hiroshima, Japan

[21] Appl. No.: 313,563

[22] Filed: Sep. 29, 1994

[30] Foreign Application Priority Data

Sep. 29, 1993 [JP] Japan .................................. 5-268235

[51] Int. Cl.⁶ .................................................. F02B 33/00
[52] U.S. Cl. .................................................. 123/564
[58] Field of Search .............................. 123/564; 60/611

[56] References Cited

U.S. PATENT DOCUMENTS

| | | | |
|---|---|---|---|
| 4,800,863 | 1/1989 | Miyagi et al. | 123/564 |
| 4,802,456 | 2/1989 | Okane et al. | 123/564 |
| 5,119,795 | 6/1992 | Goto et al. | 123/564 |
| 5,150,693 | 9/1992 | Ohnaka et al. | 123/564 |
| 5,203,309 | 4/1993 | Goto et al. | 123/564 |

FOREIGN PATENT DOCUMENTS

| | | | |
|---|---|---|---|
| 2-283816 | 11/1990 | Japan . | |
| 3-160128 | 7/1991 | Japan | 123/564 |

*Primary Examiner*—Michael Koczo
*Attorney, Agent, or Firm*—Keck, Mahin & Cate

[57] ABSTRACT

A supercharging pressure control device for an engine having a supercharger, which is driven by the engine and disposed in an intake passage downstream of an engine throttle valve, includes a bypass passage. The bypass passage connects a part of the intake passage, upstream from the supercharger and downstream from the engine throttle valve, and a part of the intake passage downstream from the supercharger. A bypass valve is disposed in the bypass passage. The bypass valve is controlled so as to allow intake air to bypass the supercharger at a controlled flow rate.

7 Claims, 8 Drawing Sheets

$\Delta P = P_{mt} - P_1$ $\Delta P = P_{mt} - P_1$

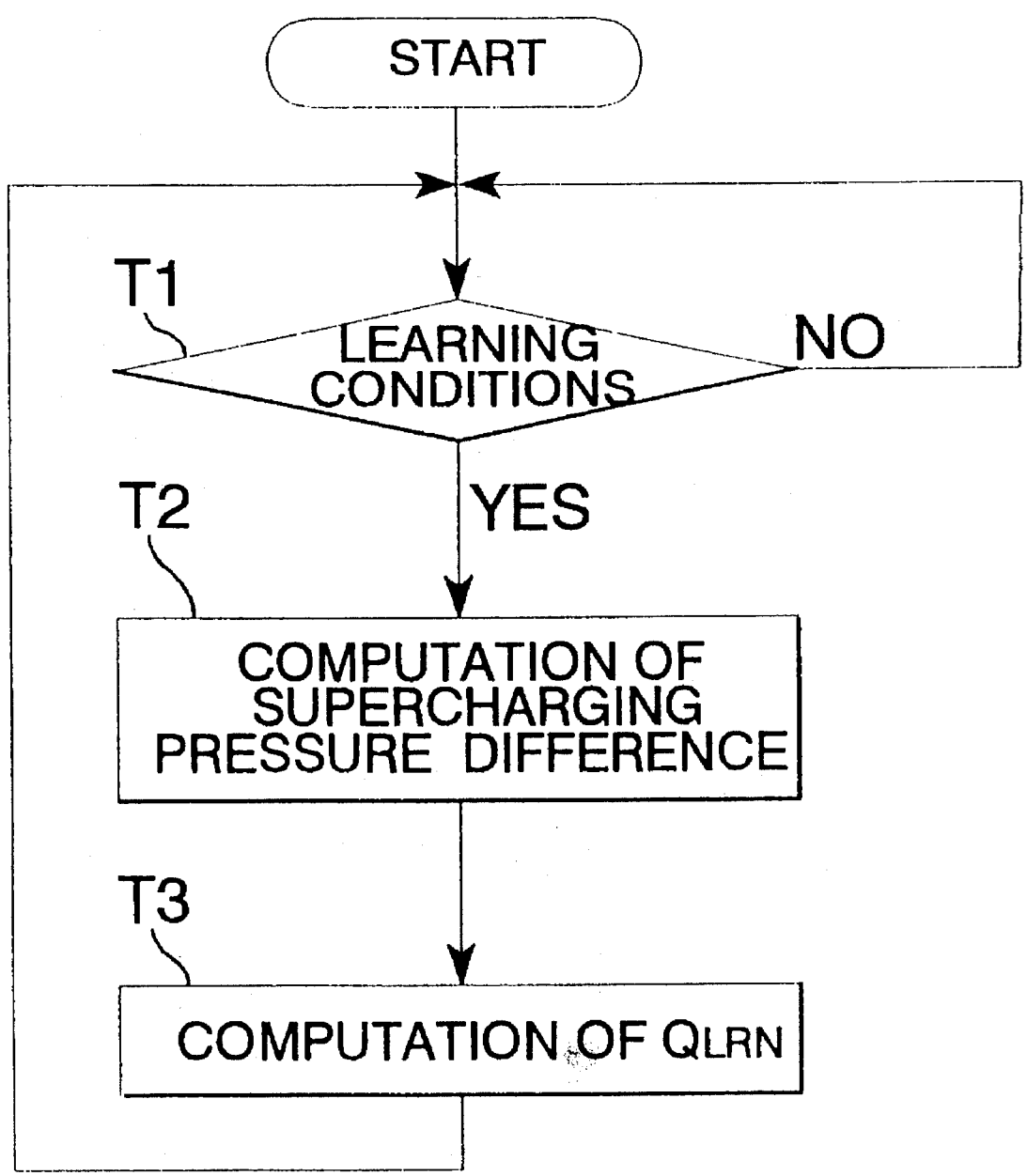

SUPERCHARGED PRESSURE CONTROL DEVICE FOR SUPERCHARGED ENGINE

BACKGROUND OF THE INVENTION

1. Field of the Invention

The present invention relates to a supercharging pressure control device for an engine equipped with a mechanical supercharger and, in particular, to a supercharging pressure control device that controls supercharging pressure by means of a bypass valve provided in an air passage bypassing the supercharger.

2. Description of Related Art

In order to cause a mechanical supercharger, directly driven by an engine, to put out supercharging pressure, supercharging pressure control devices open and close a bypass valve, provided in a bypass passage communicating portions of an intake passage upstream and downstream from a supercharger disposed between a throttle valve and a surge tank, in accordance with engine load and engine speeds. Such a supercharging pressure control device is known from, for instance, Japanese Unexamined Patent Publication No.2 - 283816. The bypass valve is generally of a type equipped with a diaphragm-type negative pressure operated actuator or, otherwise, may be an electric throttle.

In the supercharging pressure control, by means of controlling opening of the bypass valve as explained above, a target supercharging pressure is established in accordance with engine speeds and engine load which is generally represented by throttle openings by looking up a data map of target supercharging pressure with respect to bypass valve opening. Then, negative actuating pressure is developed so as to open or close the bypass valve for putting out the target supercharging pressure. In this instance, the flow rate or volume of bypassing air in the bypass passage depends upon openings of the bypass valve and the pressure difference across the bypass valve, or the difference in pressure upstream and downstream of the supercharger and, consequently, changes with changes in pressure difference even for the same bypass valve opening. Consequently, the accuracy of traction control and/or the accuracy of torque reduction control in relation to automatic transmissions worsens. For instance, when the supercharging pressure has to be 100 mm Hg for an engine speed of 2,000 rpm and a ¼ throttle opening but has to fall to the same pressure, i.e. 100 mm Hg, during traction control for a full throttle opening, the pressure downstream from the throttle valve, or upstream from the supercharger, varies greatly between during the normal supercharging pressure control with a ¼ throttle opening and during the traction control with a full throttle opening in spite of the same target supercharging pressure of 100 mm Hg. Therefore, the accuracy of traction control or the like worsens if openings of the bypass valve are set unconditionally for target supercharging pressure on the premise of performing the normal supercharging pressure control. In order to solve this problem, in the conventional supercharging pressure control, it is essential to perform control with openings of the bypass valve which are set by looking up a three dimensional map of parameters such as engine speed and throttle valve opening as well as target supercharging pressure. However, this kind of control is practically difficult. In addition, when negative actuating pressure is controlled to cause the bypass valve to attain an opening established in accordance with a target supercharging pressure, it is necessary for the supercharging pressure control device to have a separate mechanism that corrects variances in operative characteristics, peculiar to the supercharger and the control device, from intended or standardized operative characteristics. Further, it is also necessary for the supercharging pressure control device to have a sensor that detects openings of the bypass valve and a sensor that detects flow rates at which air flows through the bypass valve. These additional structural elements cause an unavoidable increase in cost and complexity in the structure of the supercharging pressure control device.

SUMMARY OF THE INVENTION

It is an object of the present invention to provide a supercharging pressure control device which realizes accurate and highly precise supercharging pressure control by altering only a target value of supercharging pressure in spite of variance in engine speed and throttle opening.

It is another object of the present invention to provide a supercharging pressure control device that can correct variances in control characteristics of a supercharger and the control device from intended or standardized control characteristics.

The foregoing objects of the present invention are achieved by providing a supercharging pressure control device for a supercharged engine which has a supercharger driven by the engine and disposed in an intake passage downstream from an engine throttle valve and a bypass valve disposed in a bypass passage which connects a part of the intake passage upstream from the supercharger and downstream from the engine throttle valve and a part of the intake passage downstream from the supercharger. This bypass valve is controlled by a control device so as to allow intake air to bypass the supercharger at a controlled flow rate. The control device sets a target supercharging air pressure in accordance with engine driving conditions, determines or calculates a target intake air flow rate of intake air to be introduced into the engine when the target pressure of supercharging air is developed, based on the target pressure of supercharging air and an engine speed, determines or calculates a target pressure of intake air in the intake passage between the supercharger and an engine throttle valve in accordance with the target flow rate of intake air and an opening of the engine throttle valve and calculates an opening of the bypass valve based on the target pressure of intake air and the engine speed. The bypass valve is controlled to provide the calculated valve opening.

Specifically, the control device further calculates a pressure difference between these target pressures of the supercharging air and the intake air, and calculates the bypass valve control value based on the pressure difference. A target discharging rate of the supercharger is estimated based on the target pressure of supercharging air, the target pressure of intake air and the engine speed, and a target flow rate, at which intake air bypasses the supercharger, is determined or calculated based on the target flow rate of intake air and the target flow rate of bypassing air. The valve control value of the bypass valve may be calculated based further on the target flow rate of bypassing air. This estimation of the target discharging rate is based on a parameter representing a ratio of the target pressure of intake air relative to the target supercharging pressure.

Further, an actual supercharging pressure, at which the supercharger discharges supercharging air, may be detected in order to be reflected on controlling of the bypass valve. That is, the target discharging rate is corrected based on a pressure difference between the target supercharging pressure and the actual supercharging pressure. Specifically, a drive means for the bypass valve may be changed in a driving characteristic based on the pressure difference.

The supercharging pressure control device of the present invention, which performs accurate and highly precise supercharging pressure control even when there is variance in engine speed and throttle opening by varying only the setting of target supercharging pressure, is based on certain aspects. Specifically, in controlling opening of the bypass valve, since the flow rate of bypassing air flowing backward during opening the bypass valve is determined unconditionally in accordance with the actuating pressure for the bypass valve, which is determined depending upon the pressure difference across the bypass valve, i.e. the pressure difference between the target supercharging pressure and the pressure of intake air upstream from the engine throttle valve, the bypassing flow rate of intake air necessary to develop or put out the target supercharging pressure can be found. In addition, when the pressure difference is found, the opening of the bypass valve necessary to provide the target supercharging pressure can be found from operational characteristics of the bypass valve.

The supercharging pressure control device of the present invention is simple in structure and corrects variances in operative characteristics peculiar to the equipped supercharger and the control device from intended or standardized functional characteristics. In addition, the supercharging pressure control device may be structured so that, if the discharging rate of air from the supercharger is estimated in order to determine or calculate the flow rate of bypassing air necessary to develop or put out the target supercharging pressure, the target discharging rate of the supercharger is estimated based on a parameter related to the ratio of pressure across the supercharger, for instance the difference in pressure between the target supercharging pressure, i.e. the pressure of air downstream from the supercharger, and the pressure of intake air upstream from the supercharger. In this instance, for example, even when an estimated target discharging rate complies with a target supercharging pressure, control errors may be produced due to changes in the density of air which are caused because the pressure of intake air downstream from the engine throttle valve varies between normal control and limited control such as traction control or the like performed with full throttle. Consequently, it is desirable to correct the target discharging rate with the pressure of intake air upstream from the supercharger.

The target supercharging pressure is found in normal supercharging pressure control conditions on a map in accordance with engine operating conditions including engine speed and throttle opening. On the other hand, specific limitations are imposed on the target supercharging pressure in, for example, a case in which traction control is conducted. When the target supercharging pressure is determined, the flow rate of intake air to be introduced into the engine, necessary to develop the target supercharging pressure, is found on a data table relating to engine speed which is experimentally prepared. Then, the bypassing flow rate of intake air, necessary to develop the target supercharging pressure, is estimated or otherwise calculated. The pressure of intake air upstream from the supercharger is determined or calculated, based on a pressure drop, depending upon the opening of engine throttle valve. Based on the bypassing intake air flow rate thus obtained and the difference in pressure across the supercharger, i.e. downstream and upstream from the bypass valve, a bypass valve control parameter, such as an actuating pressure, is determined on a map. The bypass valve is operated to open and close in accordance with this bypass valve control parameter.

The estimation of bypassing air flow rate is made by subtracting the flow rate of intake air to be introduced into the engine from a target discharging rate corresponding to engine speed which is estimated on a map based on the pressure difference as a parameter relating to the ratio between the pressure of air downstream from the supercharger and the pressure of intake air upstream from the supercharger. Using the pressure ratio, which is a factor depending upon which the discharging rate of air is generally determined, the determination or calculation of the discharging rate of air takes a relatively long time. The speed of determination or calculation is increased by substituting the pressure difference for the pressure ratio or other factors. In addition, in such a case, correction in air density is applied to the air discharging rate estimated based on the pressure difference in accordance with the supercharger inlet pressure, so as to realize the estimation of air discharging rate with a high accuracy corresponding to variances in throttle opening between under normal supercharging pressure control and under supercharging pressure control during traction control.

Furthermore, when the bypassing air flow rate or volume is estimated, after estimation of the discharging rate of air necessary for developing the target supercharging pressure, a correction is performed to increase or decrease the estimated air discharging rate uniformly by a specified value. Such a correction is performed when, for instance, a pressure difference larger than a specified pressure difference between actual and target supercharging pressures, which occurs due to variances in functional characteristics peculiar to the equipped supercharger and/or the control device from intended or standardized functional characteristics, is present. The corrected air discharging rate is held as a learned value for learning control in order to cancel variances in functional characteristics of the supercharger and/or the control device.

BRIEF DESCRIPTION OF THE DRAWINGS

The above and other objects and features of the present invention will be clearly understood from the following description of a preferred embodiment thereof when considered in conjunction with the accompanying drawings in which:

FIG. 10 is a flow chart showing a subroutine of the learned value determination in supercharging pressure control.

DESCRIPTION OF THE PREFERRED EMBODIMENT

Figure 1:
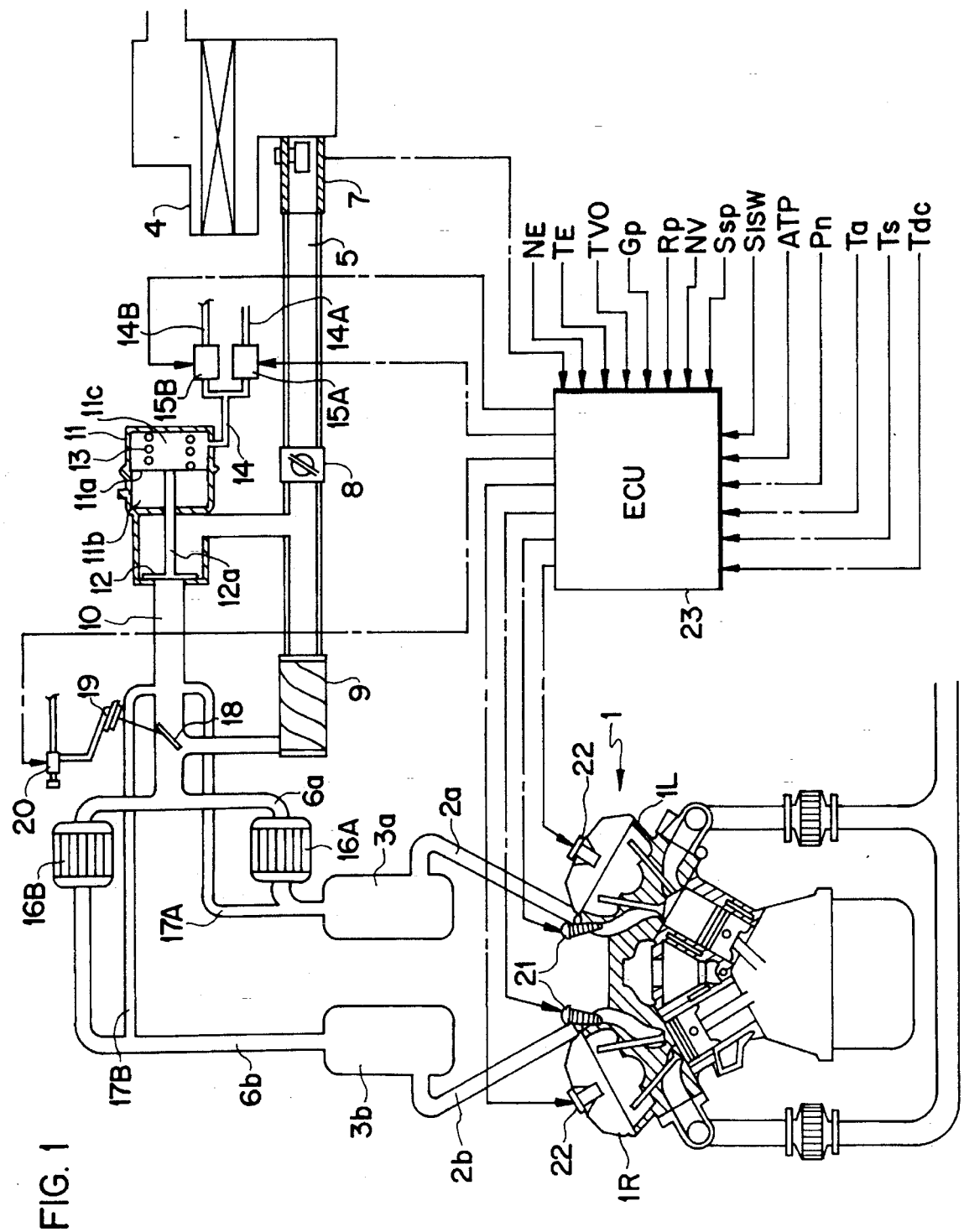
FIG. 1 is a schematic illustration showing a supercharged engine controlled by a supercharging pressure control device in accordance with a preferred embodiment of the present invention.

Referring to the drawings in detail and, in particular, to FIG. 1, a supercharged multiple cylinder V-type engine 1, which is controlled by the supercharging pressure control device in accordance with a preferred embodiment of the present invention, includes left and right cylinder banks 1L and 1R arranged in a V-formation and having a predetermined relative angle therebetween. A plurality of cylinders (not shown) are formed in each of the left and right cylinder banks 1L and 1R. The cylinders of the left cylinder bank 1L are separately communicated with a left surge tank 3a by way of discrete intake passages 2a which are relatively short in length. Similarly, the cylinders of the right cylinder bank 1R are separately communicated with a right surge tank 3b by way of discrete intake passages 2b which are relatively short in length. Each of the discrete intake passages 2a and 2b is provided with a fuel injection valve 21. Further, each of the cylinder blocks 1L and 1R is provided with one spark plug 22 for each cylinder. These fuel injection valves 21 and spark plugs 22 are controlled by an engine control unit (ECU) 23, which is comprised of a microcomputer as will be described later. The left and right surge tanks 3a and 3b are connected to downstream intake passages 6a and 6b, respectively, that branch off from a single upstream intake passage 5 with an air cleaner 4 provided at its upstream end. The upstream intake passage 5 is equipped with certain elements in a certain order from the upstream end thereof, at which the air cleaner 4 is disposed. These elements include an air flow sensor 7 which detects the flow rate of intake air, a throttle valve 8 and a mechanical supercharger 9. In addition, the upstream intake passage 5 is provided with a bypass passage 10 which allows intake air to bypass and flow around the supercharger 9. In this bypass passage, a poppet type supercharger bypass valve (ABV) 12 is provided so as to cooperate with a diaphragm-type actuator 11.

The actuator 11, which may be of any diaphragm-type well known in the art, has an atmospheric pressure chamber 11b and an actuating pressure chamber 11c divided by means of a diaphragm 11a. The diaphragm 11a is connected to a valve stem 12a of the supercharger bypass valve 12 extending so as to pass through the atmospheric pressure chamber 11b and urged by an expansion spring 13 disposed in the actuating pressure chamber 11c so as to be normally forced in the direction in which the supercharger bypass valve 12 shuts off the bypass passage 10. The actuator 11 is provided with a pressure passage 14 in order to introduce negative actuating pressure into the actuating pressure chamber 11c. The pressure passage 14 is divided at its upstream portion into two branch pressure passages 14A and 14B. One branch pressure passage 14A is connected to a negative pressure source, such as a vacuum pump (not shown), and provided with a first duty solenoid valve 15A by which it is opened and closed. Another branch passage 14B is in communication with the atmosphere and provided with a second duty solenoid valve 15B.

The branch passages 6a and 6b are provided with air-cooled intercoolers 16A and 16B, respectively. Between the supercharger bypass passage 10 and the respective intercoolers 16A and 16B, there are provided intercooler bypass passages 17A and 17B, branching off from the supercharger bypass passage 10 downstream from the supercharger bypass valve 12, which allow air to bypass the intercoolers 16A and 16B, respectively. Further, an intercooler bypass valve 18 is provided in the supercharger bypass passage 10 near the junction at which the supercharger bypass passage 10 meets the upstream intake passage 5. This bypass valve 18 switches the flow of bypass air between the downstream intake passages 6a and 6b and the intercooler bypass passages 17A and 17B. The bypass valve 18 is actuated by a diaphragm-type actuator 19 so as to normally open the supercharger bypass passage 10 and direct air into the downstream intake passages 6a and 6b and so as to close the passage 10 when a negative pressure is introduced into the actuator 19 via a three-way solenoid valve 20 and force air into the intercooler bypass passages 17A and 17B.

When there is a low load on the engine 1, both supercharger bypass valve 12 and intercooler bypass valve 18 are coincidentally opened, so that intake air introduced through the air cleaner 4 is delivered into the surge tanks 3a and 3b for the respective cylinder banks 1L and 1R after bypassing both mechanical supercharger 9 and intercoolers 16A and 16B. On the other hand, when there is a high load on the engine 1, both supercharger bypass valve 12 and intercooler bypass valve 18 are closed, so that air introduced through the air cleaner 4 flows into and is pressurized by the mechanical supercharger 9. The air is then delivered to the respective surge tanks 3a and 3b after passing through the intercoolers 16A and 16B. The supercharging pressure is controlled through controlling opening and closing of the bypass valve 12 as will be described later.

The engine control unit (ECU) 23 receives various control signals and controls the fuel injection valves 21, the spark plugs 22, the first and second duty solenoid valves 15A and 15B, and the three-way solenoid valve 20 on the basis of the control signals. The control signals includes an engine speed signal ($N_E$) indicative of the rotational speed of engine, an engine coolant temperature signal (TE) indicative of the temperature of engine coolant, a throttle opening signal (TVO) indicative of the opening of throttle valve, a gear position signal (Gp) indicative of the selected transmission gear, a range position signal (Rp) indicative of the selected range of transmission gears, a vehicle speed signal (Nv) indicative of the traveling speed of vehicle, a slippage signal (Ssp) indicative of the slippage of wheels, an idle switch signal (Sid) indicative of engine idling, an atmospheric pressure signal (Pa), a supercharging pressure signal (Pn) indicative of the pressure of supercharging air, an air temperature signal (Ta) indicative of the temperature of fresh intake air in the upstream intake passage 5 upstream from the supercharger 9, an air temperature signal (Ts) indicative of the temperature of intake air in the downstream intake passage 6a, 6b upstream from the surge tank 3a, 3b (which is hereafter referred to as the temperature of surge tank intake air), and an air temperature signal (Ta) indicative of the temperature of air discharged from the supercharger 9. These signals may be provided by means of sensors well known in the art.

Figure 2:
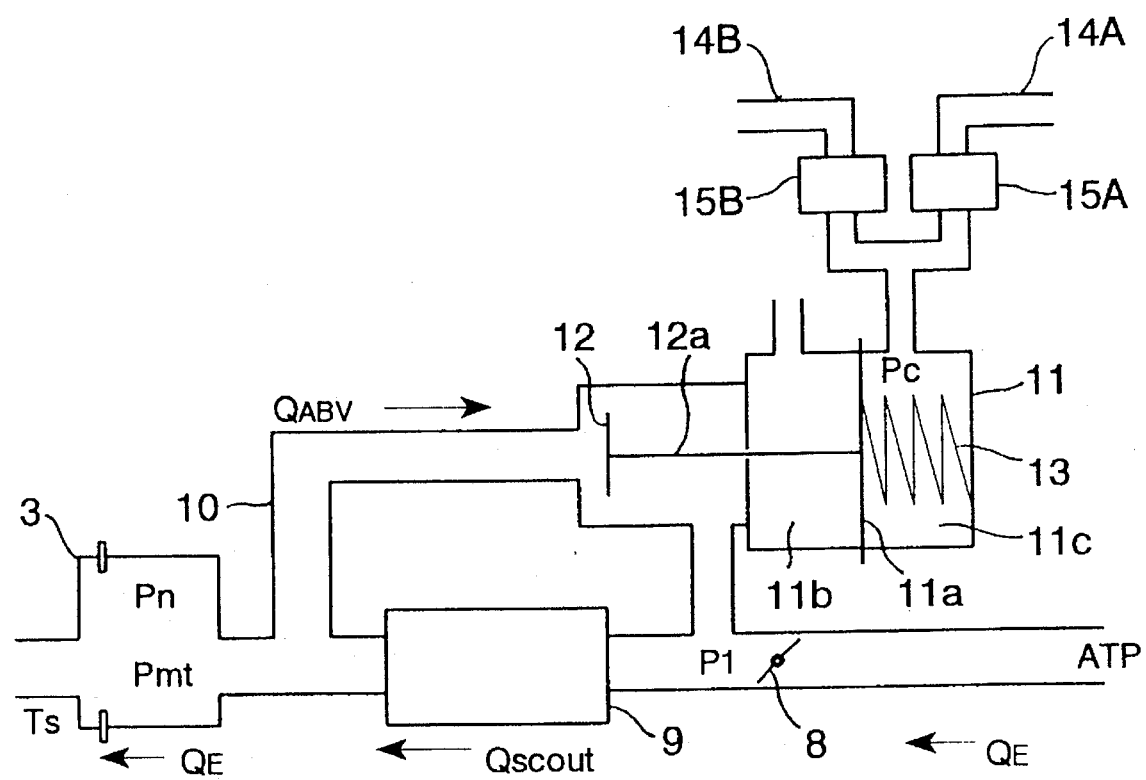
FIG. 2 is a diagrammatic illustration showing the basic logic of supercharging pressure control of the supercharging pressure control device.

FIG. 2 shows the basic logic of the control of bypassing air flow rate $Q_{ABV}$ (ABV control) for the supercharging pressure control in which a supercharging pressure Pn in the surge tanks 3a and 3b downstream from the supercharger 9 is controlled to reach a target supercharging pressure Pmt. The target supercharging pressure Pmt is normally set with reference to a map of throttle opening TVO and engine speed $N_E$. When the target supercharging pressure Pmt is set, a flow rate or volume of intake air $Q_E$ to be introduced into the engine 1 is found. This intake air flow rate $Q_E$ is determined based on a standard intake air flow rate $Q_{EO}$ to be introduced into the engine 1 under standard engine operating conditions from a data table relating engine speed Ne and target supercharging pressure Pmt. Practically, the intake air flow rate $Q_E$ is determined by correcting the standard intake air flow rate $Q_{EO}$ according to the temperature of surge tank intake air Ts. Then the pressure of intake air P1 upstream from the supercharger 9 or downstream from the throttle valve 8 (which is hereafter referred to as the upstream intake air pressure) is calculated or determined. The upstream pressure P1 of intake air is found by subtracting from the atmospheric pressure a pressure reduction which is unconditionally determined based on the throttle opening TVO and the intake air flow rate $Q_E$.

Thereafter, the discharging rate or volume of air Qscout from the supercharger 9 (which is hereafter referred to as the air discharging rate) is estimated. The air discharging rate Qscout necessary to develop the target supercharging pressure Pmt is found by estimating a basic air discharging rate $Qscout_0$ from an air discharging rate obtained from a map in which engine speed Ns and pressure difference (Pmt–P1) across the supercharger 9 are used as parameters. Practically, the air discharging rate Qscout is determined by applying a density correction to the basic air discharging rate $Qscout_0$ according to the upstream intake air pressure P1. Here, the air discharging rate Qscout is expressed as follows:

$$Qscout = Qscout_0^{P1/760}.$$

Based on the air discharging rate Qscout, a bypassing flow rate $Q_{ABV}$ of air discharged from the supercharger 9 and flowing backward in the supercharger bypass passage 10, which is necessary to develop the target supercharging pressure Pmt, is found. This bypassing air flow rate $Q_{ABV}$ is determined by subtracting from the air discharging rate Qscout the intake air flow rate $Q_E$.

In this way, when the upstream intake air pressure P1 is determined, the pressure difference (Pmt–P1) across the bypass valve 12 or between upstream and downstream locations relative to the supercharger 9 is found based on the upstream intake air pressure P1. In addition, when the bypassing air flow rate $Q_{ABV}$ is found, a negative actuating pressure Pc that should be impressed on the actuating pressure chamber 11c of the actuator 11 is determined from a map relating to characteristics of the bypass valve 12 based on the bypassing air flow rate $Q_{ABV}$ and pressure difference (Pmt–P1). Then, the duty solenoid valves 15A and 15B are controlled to communicate the actuating pressure chamber 11c of the actuator 11 with the negative pressure source or the atmosphere so as to develop the negative actuating pressure Pc in the actuating pressure chamber 11c of the actuator 11.

Figure 4:
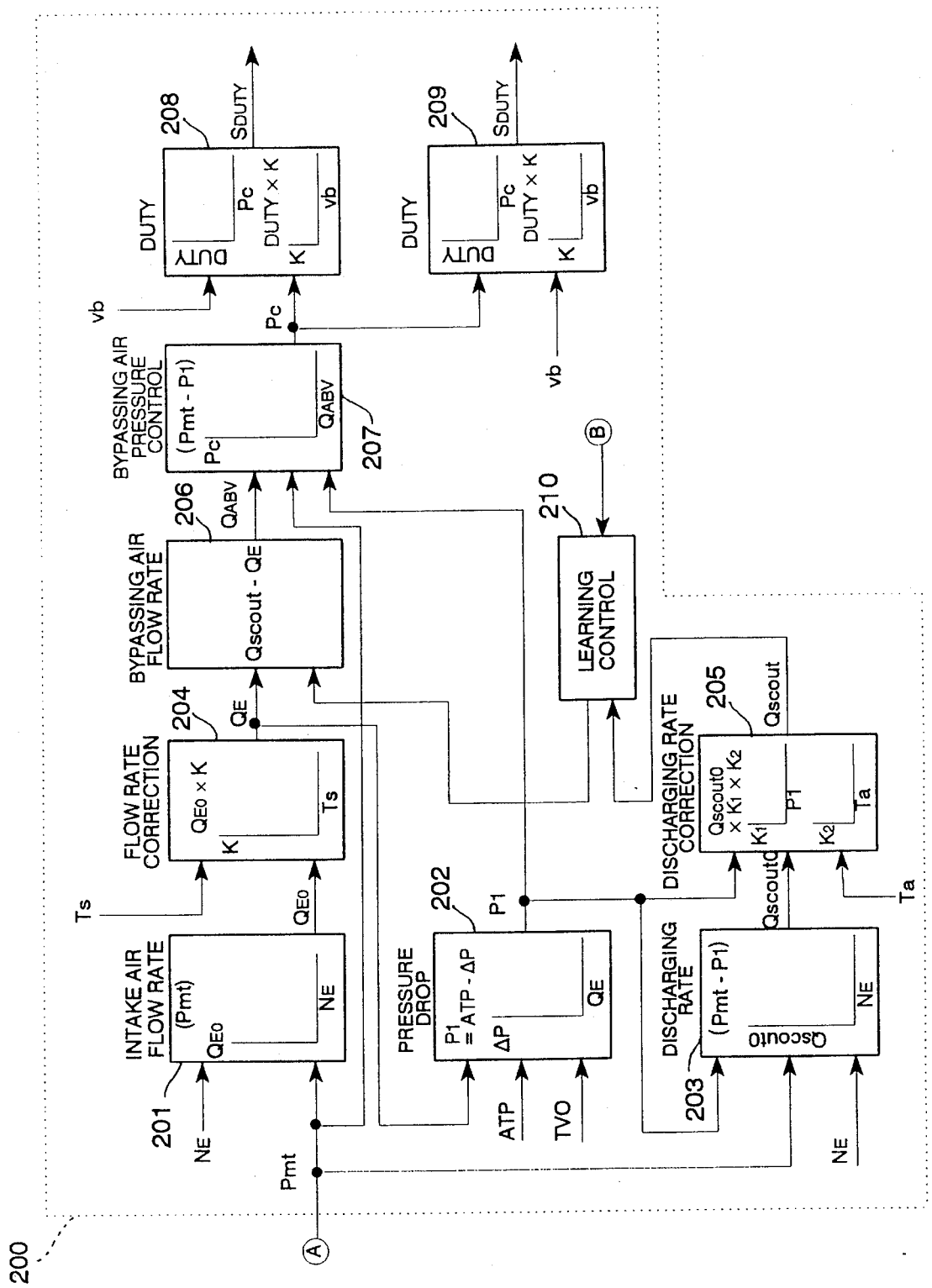
FIG. 4 is a block diagram showing an essential part of the supercharging pressure control device for controlling supercharging pressure.
Figure 5:
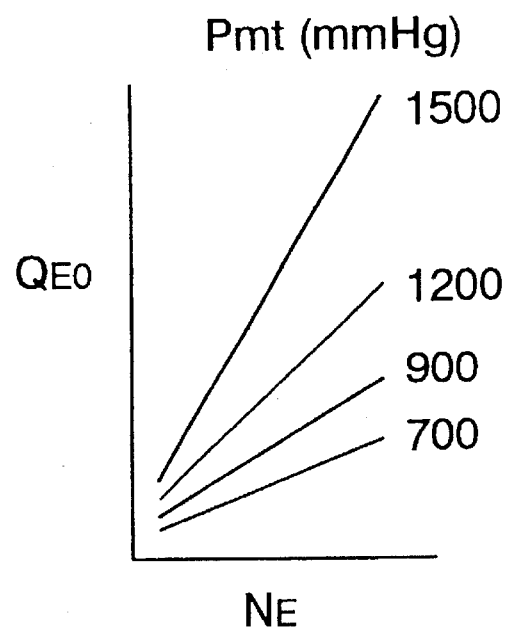
FIG. 5 is a characteristic map used for the determination of the amount of intake air in supercharging pressure control.

The bypassing air flow rate (ABV) control and supercharging pressure control are practically shown in FIGS. 4 and 5.

Figure 3:
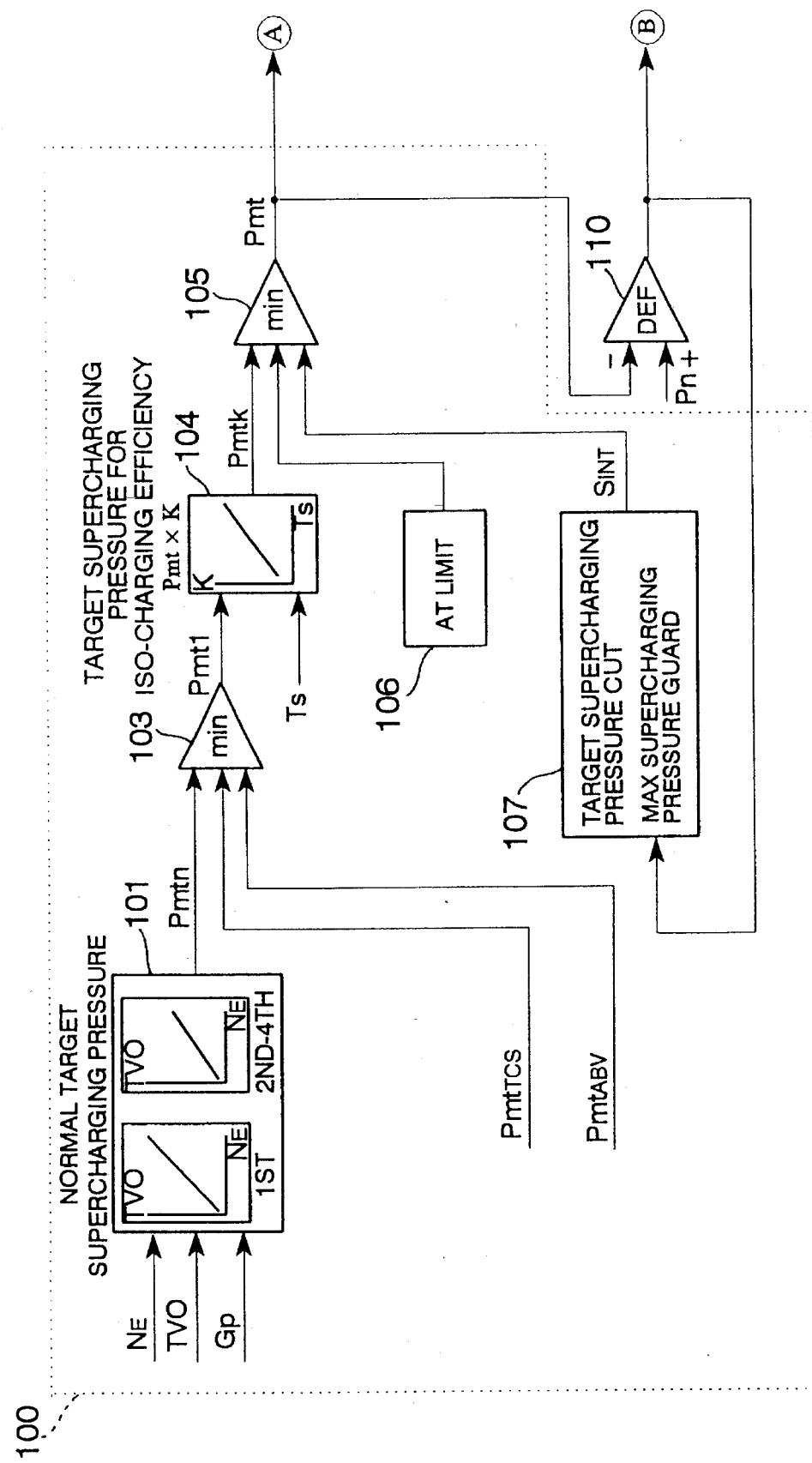
FIG. 3 is a block diagram showing an essential part of the supercharging pressure control device for establishing target supercharging pressure.

FIG. 3 is a schematic block diagram showing the setting of target supercharging pressure. The target supercharging pressure setting section 100 of the engine control unit (ECU) 23 includes a normal target supercharging pressure setting means 101 by which a normal target supercharging pressure Pmtn for normal conditions is set from a map relating to engine speed Ns and throttle opening TVO for second, third and fourth gears or a map relating to engine speed $N_E$ and throttle opening TVO for a first gear. The target supercharging pressure setting section 100 of the engine control unit (ECU) 23 further includes a first supercharging pressure limiting means 103 that limits the normal target supercharging pressure Pmtn with a target supercharging pressure PmtTCS during traction control and a target supercharging pressure $Pmt_{ABV}$ for a full throttle during engine ignition. A target supercharging pressure correction means 104 is provided for correcting the first limited target supercharging pressure Pmt1, based on the surge tank intake air temperature Ts, in order to make the charging efficiency of intake air (Ce) constant, and a second supercharging pressure limiting means 105 limits the corrected target supercharging pressure Pmtk, which is the product of the first limited target supercharging pressure Pmt1 and a correction coefficient K, with an supercharging interruption signal $S_{INT}$ which interrupts supercharging when the bypassing air flow rate (ABV) control fails, and provides an effective target supercharging pressure Pmt. In addition, the engine control unit (ECU) 23 includes a shift-related supercharging pressure limiting means 106, a supercharging pressure cut means 107 and a deflection detection means 110. The shift-related supercharging pressure limiting means 106 calculates a limiting level of pressure based on a maximum supercharging pressure specified for each gear of the automatic transmission and a pressure established for gear changing. The supercharging pressure cut means 107 receives a deflection signal, which represents a deflection between the effective target supercharging pressure Pmt determined by the second supercharging pressure limiting means 105 and the actual supercharging pressure Pn as an abnormal supercharging pressure, from the deflection detection means 110 and provides a supercharging cut signal $S_{INT}$ to the second supercharging pressure limiting means 105. Specifically, when the pressure deflection is large, this indicates that an abnormal pressure is provided. Then, the target supercharging pressure is cut or limited to a very low level. Otherwise, the target supercharging pressure is guarded by a guard level. In this way, after the normal target supercharging pressure Pmtn has thus been limited and corrected, it is sent as the effective target supercharging pressure Pmt to the supercharging pressure controller 200 shown in FIG. 4.

FIG. 4 is a schematic block diagram showing the control of supercharging pressure. The target supercharging pressure control part 200 of the engine control unit (ECU) 23 includes an intake air flow rate determining means 201, a pressure determining means 202 for calculating or determining the upstream intake air pressure P1, an estimation means 203 for the estimation of air discharging rate Qscout, a first correction means 204 for the temperature-related correction of intake air flow rate $Q_E$ according to the temperature of surge tank intake air Ts, a second correction means 205 for the density-related correction of basic air discharging rate $Qscout_0$, a bypassing air flow rate determining means 206, a valve control pressure difference calculation means 207, duty rate calculating means 208 and 209 for the calculation of duty rates of the duty solenoid valves 15A and 15B, and a learning control means 210.

Figure 6:
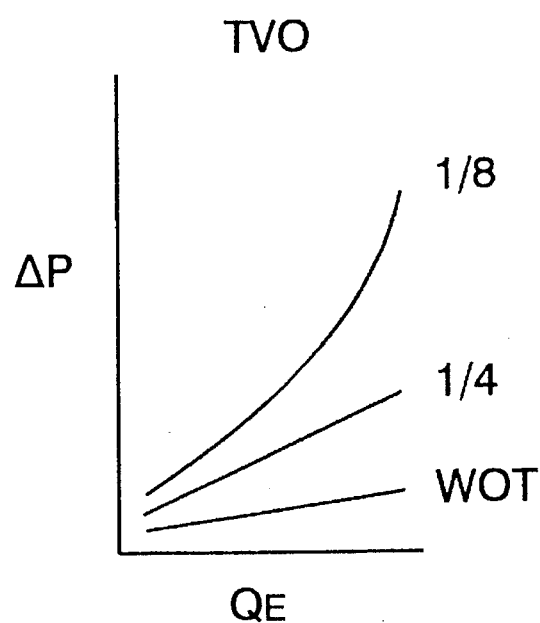
FIG. 6 is a characteristic map used for the determination of pressure difference in supercharging pressure control.
Figure 7:
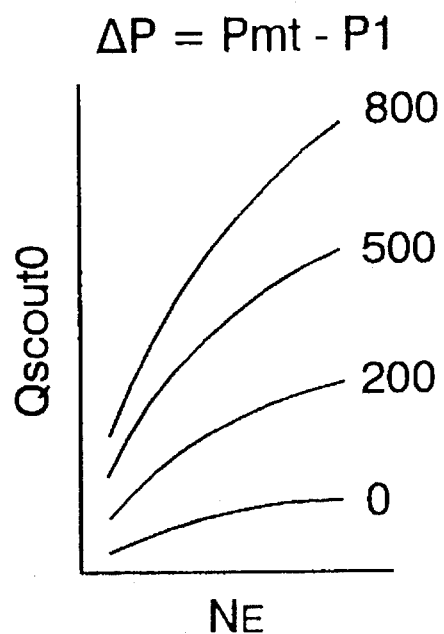
FIG. 7 is a characteristic map used for the determination of the discharged amount of air from the supercharger in supercharging pressure control.

Specifically, a signal representative of the target supercharging pressure Pmt established in the target supercharging pressure setting section 100 is sent to the intake air flow rate determining means 201, where the standard intake air flow rate $Q_{EO}$ for the attainment of the target supercharging pressure Pmt is found from a standard intake air flow rate map relating to engine speed $N_E$ in which target supercharging pressure Pmt is used as a parameter. This standard intake air flow rate map, such as that which is shown in FIG. 5, is provided based on experimental data. Then, in the first correction means 204, a temperature correction is made for the standard intake air flow rate $Q_{EO}$ according to the surge tank air temperature Ts so as to provide the corrected intake air flow rate $Q_E$. Subsequently, in the pressure determining means 202, a pressure drop $\Delta P$ across the throttle valve 8 from the atmospheric pressure ATP upstream from the throttle valve 8 as a standard is found on a pressure drop map relating to intake air flow rate ($Q_E$) shown in FIG. 6 in which throttle opening TVO is used as a parameter and the upstream intake air pressure P1 is calculated by use of the formula, P1=ATP–$\Delta P$. Further, in the estimation means 203, the basic air discharging rate $Qscout_0$ is estimated from an air discharging rate map relating to engine speed $N_E$ shown in FIG. 7. In this estimation, used as a parameter is the pressure difference ($\Delta P$=Pmt–P1) across the supercharger 9 which has to be produced in order to develop the target supercharging pressure Pmt. In the second correction means 205, a density correction is made for the basic air discharging rate $Qscout_0$ in accordance with the upstream intake air pressure P1 and with the air temperature Ta of intake air in the upstream intake passage 5 upstream from the supercharger 9. In addition, if, for instance, the deflection of the actual supercharging pressure Pn from the target supercharging pressure Pmt exceeds a specified pressure value, a correction is performed so as to increase or decrease the corrected air discharging rate Qscout by a specified value of pressure. The increased or decreased air discharging rate Qscout is used as a learned air discharging rate $Q_{LRN}$ in learning control. The air discharging rate Qscout thus corrected is sent to the bypassing air flow rate determining means 206.

Figure 8:
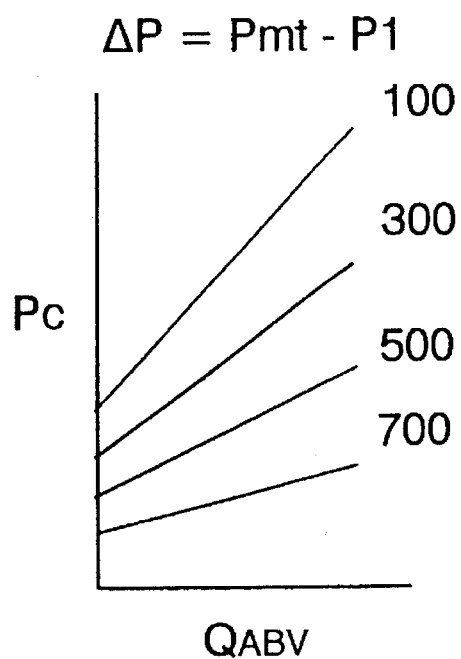
FIG. 8 is a characteristic map used for the determination of negative actuating pressure in supercharging pressure control.

In the bypassing air flow rate determining means 206, a calculation is made to obtain the difference between the air discharging rate Qscout and the intake air flow rate $Q_E$ as the bypassing air flow rate $Q_{ABV}$ for the attainment of the target supercharging pressure Pmt. Subsequently, in the valve control pressure difference calculation means 207, the negative actuating pressure Pc that should be introduced into the actuating pressure chamber 11c of the actuator 11 is determined from an actuating pressure map relating to bypassing air flow rate $Q_{ABV}$ shown in FIG. 8. In this map, used as a parameter is the difference in pressure between target supercharging pressure Pmt and upstream intake air pressure P1. Finally, in the duty rate calculation means 208 and 209, duty rates, at which the duty solenoid valves are driven, are determined for the duty solenoid valves 15A and 15B, respectively. Drive signals $S_{DUTY}$, representing these duty rates, are provided for the duty solenoid valves 15A and 15B, respectively, after a correction according to battery power (vb).

Figure 9:
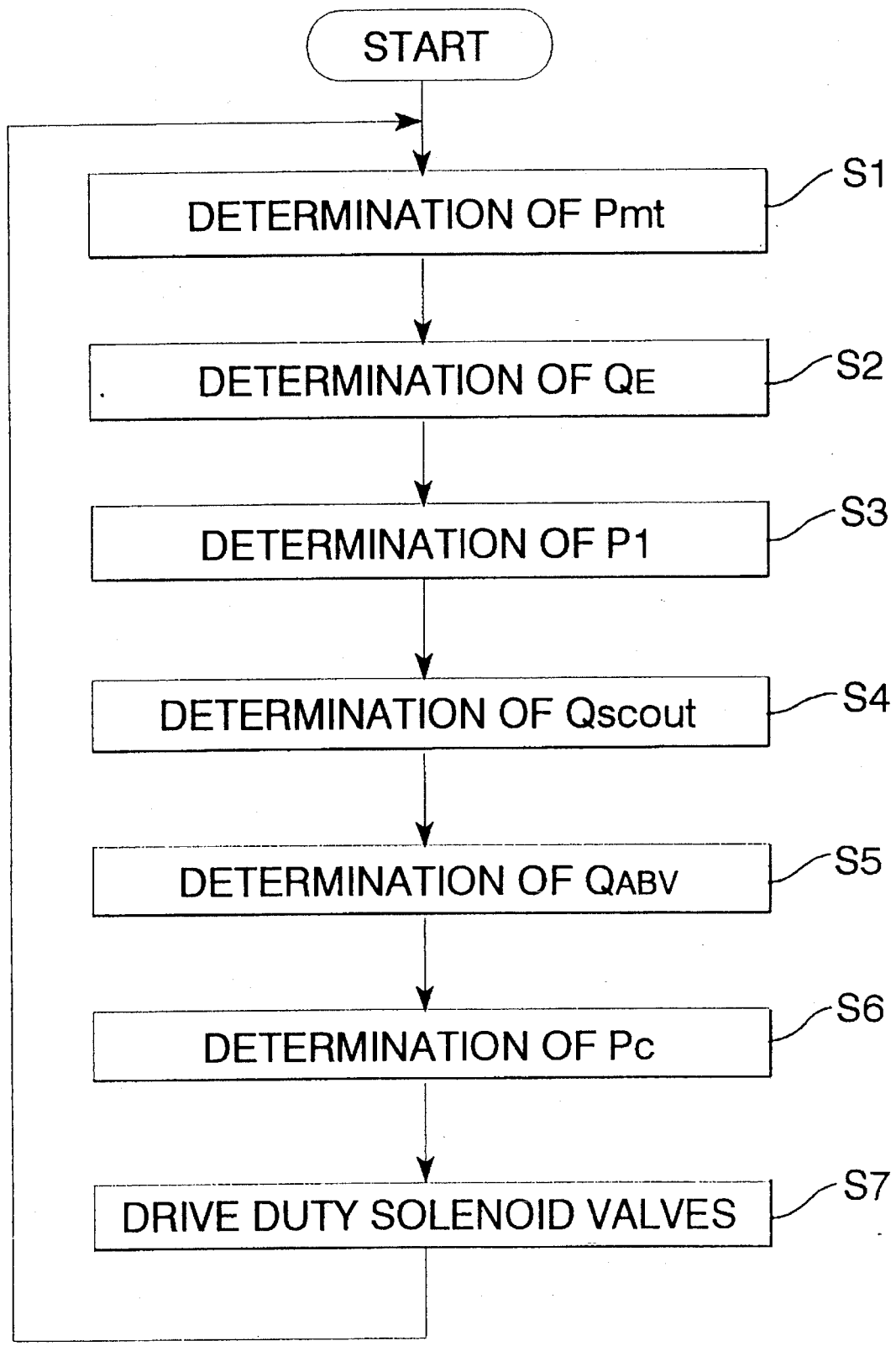
FIG. 9 is a flow chart illustrating a main sequential routine of the supercharging pressure control.

The operation of the supercharging pressure control device depicted in FIG. 1 will be best understood by reviewing FIGS. 9 and 10, which are flow charts illustrating routines for the microcomputer of the engine control unit (ECU) 23. Programming a computer is a skill well understood in the art. The following description is written to enable a programmer having ordinary skill in the art to prepare an appropriate program for the microcomputer. The particular details of any such program would, of course, depend upon the architecture of the particular computer selected.

FIG. 9 is a flow chart of the supercharging pressure control sequence routine for the microcomputer. Control commences and proceeds directly to step S1 where a target supercharging pressure Pmt is determined based on control signals of a throttle opening TVO, an engine speed $N_E$, a selected gear position Gp, a selected range position Rp, and various torque reduction control signals. In step S2, an intake air flow rate $Q_E$ corresponding to the target supercharging pressure Pmt is determined by correcting a standard intake air flow rate $Q_{EO}$, which is found from the standard intake air flow rate map (shown in FIG. 5) according to an engine speed $N_E$, with the temperature of surge tank intake air Ts. Subsequently, in step S3, an upstream intake air pressure P1 is determined based on a pressure drop $\Delta P$ across the throttle valve 8 corresponding to a throttle opening TVO from the pressure drop map (see FIG. 6). In step S4, a basic air discharging rate $Qscout_0$ is found from the basic air discharging rate map (see FIG. 7) according to the pressure drop $\Delta P$ and subjected to the density-related correction relating to upstream intake air pressure P1 and fresh intake air temperature Ta so as to determine an air discharging rate Qscout.

Thereafter, a bypassing air flow rate $Q_{ABV}$ is determined in step S5. In this instance, the bypassing air flow rate $Q_{ABV}$ is determined as the difference between the air discharging rate Qscout and the intake air flow rate $Q_E$ added by the learned air discharging rate $Q_{LRN}$. In step S6, a negative actuating pressure Pc is determined from the actuating pressure map relating to bypassing air flow rate $Q_{ABV}$ shown in FIG. 8 according to the pressure difference $\Delta P$. As is apparent from FIG. 8, the bypass valve 11a is opened largely with an increase in bypassing air flow rate $Q_{ABV}$ or with a decrease in pressure difference $\Delta P$ (=Pmt–P1). Finally, in step S7, duty solenoid valves 15A and 15B are driven so as to develop the negative actuating pressure Pc in the actuating pressure chamber 11c of the actuator 11.

FIG. 10 is a flow chart of the learned air discharging rate determination sequence routine. Determination sequence control commences and proceeds to step T1 where a decision is made as to whether or not specified learning conditions have been provided. This decision is repeatedly made until the answer "YES" is provided. A "YES" answer allows the sequence to proceed to step T2 where the deflection of the actual supercharging pressure Pn from the target supercharging pressure Pmt is calculated, and subsequently to step T3 where the learned air discharging rate is calculated in accordance with the supercharging pressure deflection. The learned air discharging rate $Q_{LRN}$ is increasingly corrected if the actual supercharging pressure Pn is larger than the target supercharging pressure Pmt or is decreasingly corrected if the actual supercharging pressure Pn is smaller than the target supercharging pressure Pmt. In the learning control means 210, the learned air discharging rate $Q_{LRN}$ is added to the air discharging rate Qscout.

In the supercharging pressure control device of the present invention, the control of supercharging pressure may be performed by controlling an opening of an electrically controlled throttle valve instead of controlling the negative actuating pressure introduced into the actuator.

With a supercharging pressure control device according to the present invention, the bypass valve is controlled based on the bypassing air flow rate and the pressure difference across the supercharger. The control of supercharging pressure is accurately performed with a high degree of control precision by merely changing the setting of target supercharging pressure and without using a complicated control that changes the mapped value according to engine speeds and throttle openings. In addition, not only because the bypassing air flow rate is determined based on an estimated discharging rate of air from the supercharger, but also because the estimated discharging rate of air is corrected according to a deflection of an actual supercharging pressure from a target supercharging pressure and retained as a learned air discharging rate of the supercharger, a control in which variances in the operative characteristics peculiar to the supercharger and the control device from intended or standardized operative characteristics have been corrected can be performed.

Furthermore, because the bypassing air flow rate is determined from the estimated air discharging rate of the supercharger which has been corrected in accordance with the pressure of intake air upstream from the supercharger, the supercharging pressure control is performed with a high precision corresponding both to normal supercharging conditions, in which a throttle opening is different, and to conditions in which supercharging pressure is limited.

It is to be understood that whereas the present invention has been described in detail with respect to a preferred embodiment thereof, nevertheless, various other embodiments and variants are possible which fall within the spirit and scope of the present invention. Such other embodiments and variants are intended to be covered by the following claims.

What is claimed is:

1. A supercharging pressure control device for a supercharged engine, said supercharging pressure control device including a supercharger which is driven by the engine and disposed in an intake passage downstream from an engine throttle valve, a bypass passage which connects a part of the intake passage upstream from the supercharger and downstream from the engine throttle valve and a part of the intake passage downstream from the supercharger so as to allow intake air to bypass the supercharger, a bypass valve disposed in the bypass passage for controlling an air flow rate in the bypass passage, and a control device for controlling operation of the bypass valve, said control device comprising:

opening detecting means for detecting a throttle opening of said engine throttle valve;

speed detecting means for detecting a rotational speed of said engine;

supercharging pressure setting means for setting a target supercharging pressure at which said supercharger charges air into said engine in accordance with driving conditions of said engine;

intake air flow rate determination means for determining a target flow rate of intake air to be introduced into said engine, upon development of said target supercharging pressure, based on said target supercharging pressure and said rotational speed of said engine;

pressure determination means for determining a target pressure of intake air in said intake passage between said supercharger and said engine throttle valve in accordance with said target intake air flow rate and said throttle opening of said engine throttle valve;

control value determining means for determining a control value based on said target pressure of intake air and said rotational speed of said engine; and valve drive means for driving said bypass valve with said control value, thereby providing said target supercharging pressure.

2. A supercharging pressure control device as defined in claim 1, wherein said control value determining means further determines a pressure difference between said target supercharging pressure and said target pressure of intake air and said control value based on said pressure difference.

3. A supercharging pressure control device as defined in claim 2, and further comprising estimation means for estimating a target discharging rate of said supercharger based on said target supercharging pressure, said target pressure of intake air, and said rotational speed of said engine, and bypassing air flow rate determination means for determining a target bypassing air flow rate, at which intake air bypasses said supercharger, based on said target flow rate of intake air and said target bypassing air flow rate, wherein said control value determining means determines said control value based further on said target bypassing air flow rate.

4. A supercharging pressure control device as defined in claim 3, wherein said estimation means estimates said target discharging rate based on a parameter representing a ratio of said target pressure of intake air relative to said target supercharging pressure.

5. A supercharging pressure control device as defined in claim 3, and further comprising pressure detecting means for detecting an actual supercharging pressure, at which said supercharger discharges supercharging air, wherein said estimation means corrects said target discharging rate based on a difference between said target supercharging pressure and said actual supercharging pressure.

6. A supercharging pressure control device as defined in claim 1, and further comprising pressure detecting means for detecting an actual supercharging pressure, at which said supercharger discharges supercharging air, wherein said valve drive means changes a driving characteristic thereof based on a difference between said target supercharging pressure and said actual supercharging pressure.

7. A supercharging pressure control device as defined in claim 1, wherein said supercharger is of a mechanical type.

* * * * *